June 14, 1960
W. J. SAVAGE ET AL
2,940,801
DIRT AND WATER SEAL FOR JOURNAL BOXES
Filed June 19, 1957
3 Sheets-Sheet 1
FIG. 1.
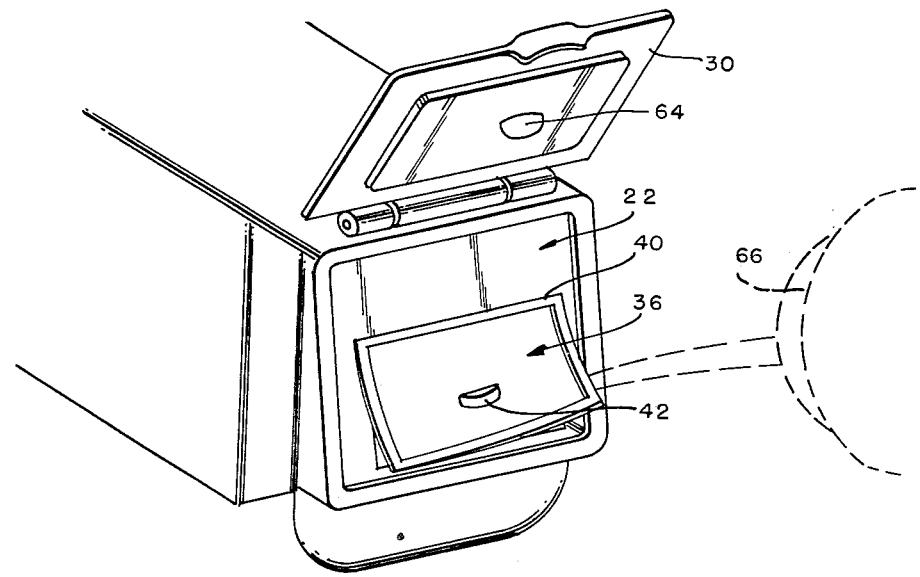
FIG. 2.
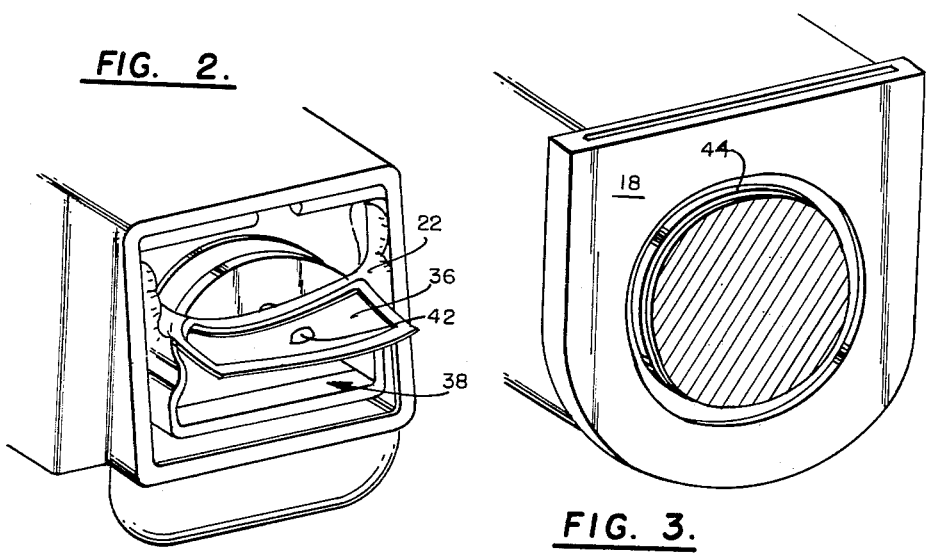
FIG. 3.
INVENTORS
William John Savage
Robert James Savage
BY
ATTORNEYS

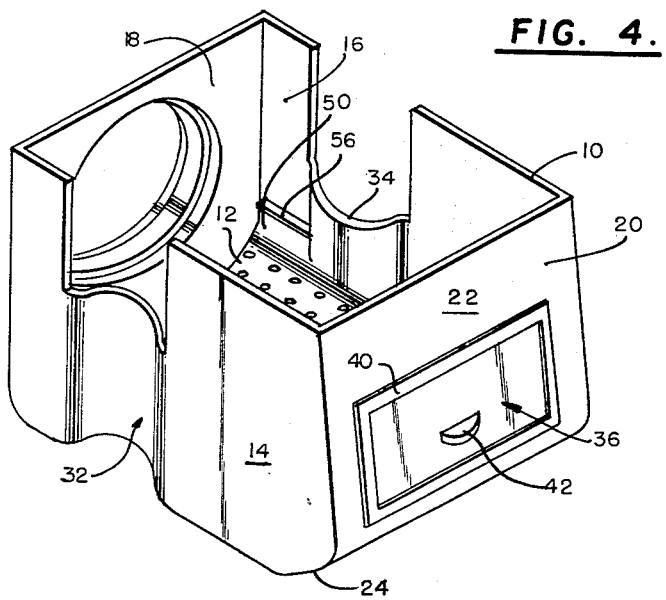
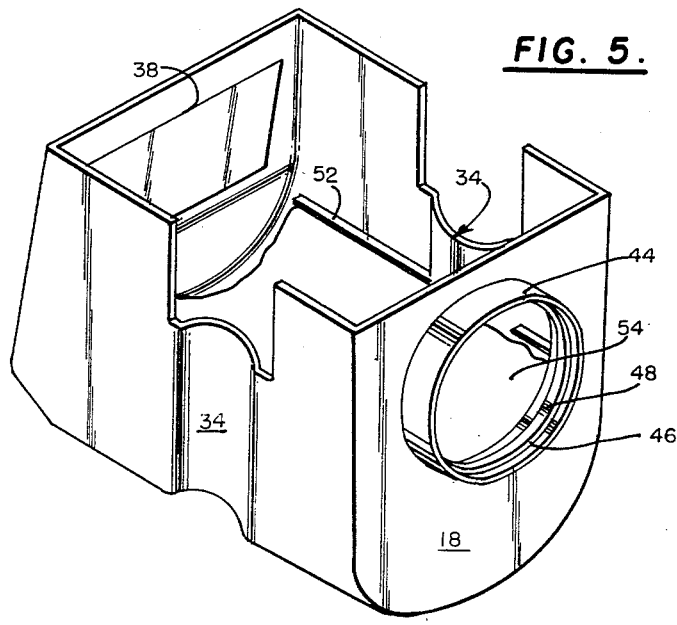

June 14, 1960  W. J. SAVAGE ET AL  2,940,801
DIRT AND WATER SEAL FOR JOURNAL BOXES
Filed June 19, 1957  3 Sheets-Sheet 3

INVENTORS
William John Savage
Robert James Savage

BY
ATTORNEYS

United States Patent Office 2,940,801
Patented June 14, 1960

2,940,801
DIRT AND WATER SEAL FOR JOURNAL BOXES

William John Savage, Box 123, Kelly Lake, Minn., and Robert James Savage, R.R. 1, Box 183A, Hibbing, Minn.

Filed June 19, 1957, Ser. No. 666,579

9 Claims. (Cl. 308—83)

This invention relates to a dirt and water seal for journal boxes.

A problem that has never been satisfactorily overcome is that of preventing dirt and water from getting into contact with the journals. The attendant increase in wear to hot box incidents has plagued the railroads for many years. Usually the journal boxes are provided with covers for inspection and oiling but these covers also provide means of access for the dirt and moisture into the boxes. Further, there is condensation which occurs in the boxes which introduces water. In addition the axle extends out through the inner side of the journal box and this provides a means for the entrance of the water and the dirt.

Over the years many different types of bearing inclosures have been suggested to be used inside the boxes as a means for segregating the dirt and water from oil so that the bearings will be lubricated by the oil but will not come in contact with the dirt and water. These involve many different concepts. Examples of such prior proposed constructions are shown in viz. Patents No. 2,661,255 and No. 1,510,377.

All prior suggestions embody the use of rigid non-flexible means of inclosure for the journals and shafts. This creates problems in itself and in addition increases considerably the cost and complexity of the journal constructions. Also these prior proposed constructions often hinder inspections and replacement of the brasses. Accordingly an object of my invention is to provide a bearing dirt and water seal which is not costly, which will nonetheless effectively perform the function of sealing the bearings from dirt and water and yet which will also make it possible to readily inspect the journal and install chips and brasses if necessary.

Another object of the invention is to provide a bearing dirt and water seal construction which remains flexible and which accordingly will conform to movements of the axle with respect to the box without strain or breakage and which also will not damage the axle in any way.

A further object of the invention is to provide a dirt and water seal construction which will completely and effectively seal the journal from dirt and water and yet in which readily and easily inspection removal of the elements is possible.

It is also an object of the invention to provide a seal as set forth above wherein an effective inner sealing relationship with respect to the axle is provided so that water and dirt cannot enter along the axle.

A further object of the invention is to provide a journal seal which can be readily removed or reinserted into the journal box.

Still another object of the invention is to provide a journal seal which can be inserted in the boxes without modification of the boxes.

One object of the invention is to provide a seamless one-piece journal seal construction of a resilient and flexible character which will conform to the movements of the elements within the journal box.

A still further object of the invention is to provide a journal seal construction of resilient flexible material which is of adequate strength and rigidity for the purposes.

Yet a further object of the invention is to provide a bearing seal with means for mounting and supporting a bearing lubricant pack in proper relationship with the bearing which is completely resilient and flexible.

An additional object of the invention is to provide a bearing seal having an inner oil seal ring for cooperation with the axle and rib means adapted to maintain a journal pack in place which also functions with means for properly maintaining the position of the oil seal on the axle.

One other object of the invention is to provide a removable one-piece resilient flexible oil and water seal construction having integral means for maintaining the seal in fixed relationship above the bottom of the journal box.

Yet a further object of the invention is to provide a bearing seal as set forth above having an inspection cover which is accessible upon opening of the journal box cover and which cover can be displaced through deformation of the seal to permit the introduction of oil or for inspection purposes and which further embodies construction such that it can be readily deformed to admit of the inspection or replacement of brasses.

Yet another object of the invention is to provide a resilient, deformable and flexible oil seal including means for supporting such seal in spaced relationship to the bottom of the journal box which provides uniform pressure against the oil pack.

It is also an object of the invention to provide means for supporting the seal within journal boxes which is adaptable to varied types of journal boxes.

One other object of the invention is to provide a flexible deformable seal which will move with the movement of the journal thereby reducing wear on the seal and making it unnecessary to replace the seals at very frequent intervals.

These and other objects and advantages will become apparent from the following description and the accompanying drawings wherein:

Figure 1 is a fragmentary perspective view of a journal box illustrating a seal constructed in accordance with the invention mounted in the box.

Figure 2 is a view similar to Figure 1 but showing the manner in which the face or front of the seal can be deformed for inspection of the journal.

Figure 3 is a fragmentary rear perspective view illustrating the seal ring in cooperation with the journal shaft.

Figure 4 is a perspective view of a seal constructed in accordance with the invention taken from the front end of the seal.

Figure 5 is a similar perspective view but taken from the rear end of the seal of Figure 4.

Figure 6:
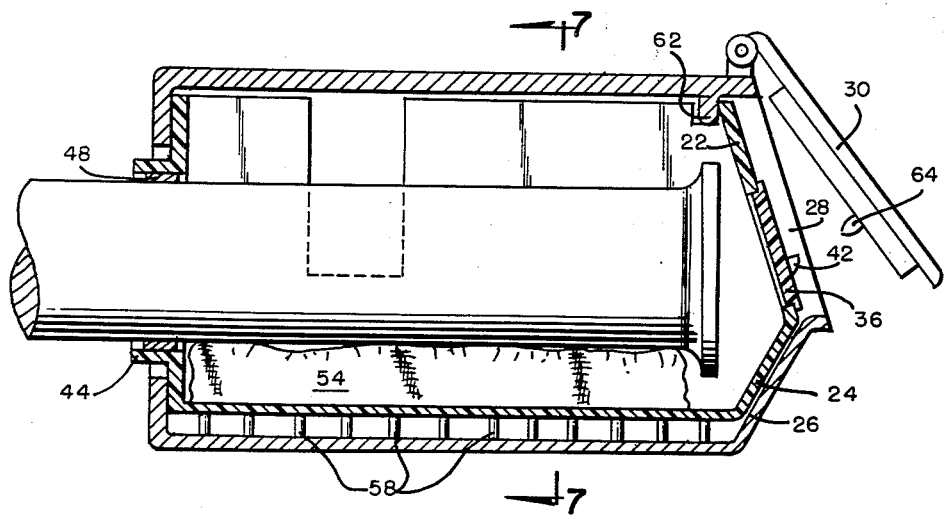
Figure 6 is a sectional elevational view illustrating a seal constructed in accordance with the invention and supported in a journal box.

Referring now in particular to the drawings: The seal 10 comprises an oil pack pan 12, side forming members 14 and 16, and end members 18 and 20 extending upwardly from the pan 12. The end member 20 constitutes the front end of the seal. The end member 20 is formed of two portions 22 and 24 set at an acute angle with respect to each other and conforming to the shape of a journal box front including the cover as indicated in Figure 6. As illustrated the usual journal box 25 has an upwardly extending front portion 26 which merges into the opening 28 which is normally closed by the cover 30. The sides 14 and 16 are provided with recesses 32 and 34, respectively, which are adapted to conform with the U-bolt recesses in the journal box. The side members are also cut out above said recesses to accommodate the inwardly extending rib provided in the journal box adjacent the U-bolt recesses. The front of the seal is provided with a cover element 36. This comprises a member formed integrally with the front panel 22. Cover 36 is formed so as to normally extend over the opening 38 provided in the front panel behind the cover. The cover comprises an upper rim 40 which is united to the front upper panel 22. A knob 42 projects outwardly from the cover for a purpose to be hereafter described.

The rear end member 18 is provided with a cylindrical flange 44 extending laterally outwardly of the rear end member. This flange is formed integrally with the remainder of the seal and the flange includes a cylindrical recess 46 within which is mounted a felt cylindrical seal 48.

The oil pack pan terminates at the side members whereat there is provided longitudinally extending ribs 50 and 52 each of which is broken at the recesses 34. These ribs comprise resilient deformable members which are integral with the seal and normally tend to extend downwardly alongside the lower oil pan. However, they can be deformed to receive oil pack means such as pack 54 therebetween and function to maintain the pack in position. The seal is provided with flanges 56 adjacent the ribs which together with the ribs stiffen the seal longitudinally and function as a means to assist in the proper positioning of the cylindrical flange 44 and associated felt seal 48. The bottom of the seal is provided with a series of peg like formations 58 extending vertically downwardly therefrom to provide a substantially uniform horizontally disposed plane of support for the seal.

The seal can be inserted into the journal box by raising the boxes in the usual manner to take the load off the bearings, removal of the brass and then insertion of the seal. The seal is simply inserted over the end of the axle. The seal is pushed inwardly until it abuts against the rear of the journal box. The brass can then be inserted and the box lowered onto the axle.

The oil pack 54 is placed in position beneath the ribs 50 and 52.

The upper front panel 22 of the seal will abut against the rib 62 in the usual type of box encountered on the railroads.

The knob 42 will be abutted by the tab 64 when the cover 30 is closed. This will maintain the cover 36 in a closed position. When the cover 30 is closed and the seal 48 abutting against the periphery of the axle it is seen that there is no chance for dirt or water to contact the axle. The pegs 58 maintain the seal itself above the floor of the journal box and provide a space for the accumulation of dirt and water. The pegs also assure a uniform pressure against the oil pack so that it in turn bears uniformly against the axle. This peg construction and the resilient flexible construction of the seal enable the seal to conform to the journal box. The seal is firm as a unitary molded element, and is entirely composed of a rubbery material or other material having the resilient flexible characteristics of rubbery materials.

Figure 1 illustrates the cover 30 of the journal box in open position and the use of an oil can 66 to displace the cover 36 and introduce oil into the seal.

Figure 2 illustrates how the seal can be deformed for inspection of the brass and chips and replacement thereof.

Figure 3 illustrates the rear of the box with the seal in place and the felt ring securely contacting the periphery of the axle.

Figure 7:
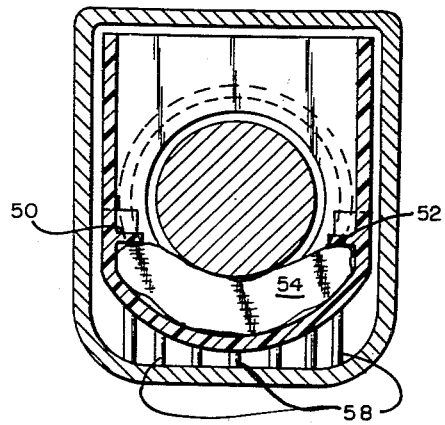
Figure 7 is a sectional view taken along line 7—7 of Figure 6.

Figures 6 and 7 illustrate an axle journal portion 66 received in the seal and the seal in position in the journal box 25.

One of the big advantages of the instant invention is the fact that the water and dirt seal is completely flexible and can follow the movements of the axle without damage and without loss of sealing function. Thus the felt ring can move with the axle and still maintain a tight seal. In all heretofore known seals this could not occur and as a result the seals were not effective and soon were a source of trouble.

Further, an important advantage of the instant invention due to the resilient nature of the cover 36 is that a perfect seal can be achieved, and yet without relatively pivotally connected or disconnectable elements the oil can be introduced and complete inspection is possible.

While we have shown and described the preferred form of our invention, it will be understood by those skilled in the art that many changes in form and details of construction can be made within the scope of the appended claims, and we claim an exclusive right to all changes, modifications, and forms coming within the scope of the appended claims.

We claim:

1. An oil seal for journal boxes comprising an oil pack pan forming the base of said seal, a front side element and a rear side element extending upwardly from said pan, other spaced side elements connected to and extending laterally of the first mentioned side elements, said front side element having an inspection opening, a cover means comprising an element integrally connected to said front side element and normally in a position to close said opening in said front side element, said cover being readily displaceable through deformation of said seal to uncover said opening, the rear side element having a cylindrical flange, a cylindrical sealing member mounted within said flange and adapted to sealingly contact the periphery of an axle, said seal being formed completely of resilient flexible readily deformable material.

2. An oil seal for journal boxes comprising an oil pack pan forming the base of said seal, a front side element and a rear side element extending upwardly from said pan, other spaced side elements connected to and extending laterally of the first mentioned side elements, said front side element having an inspection opening, a cover means comprising an element integrally connected to said front side element and normally in a position to close said opening in said front side element, said cover being readily displaceable through deformation of said seal to uncover said opening, the rear side element having a cylindrical flange, a cylindrical sealing member mounted within said flange and adapted to sealingly contact the periphery of an axle, said seal being formed completely of resilient flexible readily deformable material, a pair of spaced ribs longitudinally positioned within said seal and extending along the lateral edges of said oil pan, said ribs each being in overlying relationship with said oil pan and normally positioned substantially parallel thereto, said ribs being deformable and adapted to receive an oil pack member between said ribs and said oil pan and to resiliently compress said pack member between said pan and said ribs.

3. The apparatus of claim 2 wherein said ribs extend to and abut against said rear side element and function as stiffening means in facilitating and maintaining the relative position of said rear side element with respect to the remaining portions of said seal.

4. An oil seal for a journal box comprising an oil pack pan having a generally semi-cylindrical concave interior, spaced end members extending upwardly from said pan, one of said end members having an inspection opening therein, means integrally connected to said one of said end members and normally closing said inspection opening, the other of said end members having an opening therein for receiving an axle, spaced additional side members extending upwardly from said oil pan forming member and extending laterally of the first mentioned end members and being connected thereto, support means extending downwardly beneath said oil pan forming member, each of said support means comprising a peg like formation and being spaced from the other of said support means, said support means presenting a substantially uniform plane of support for said oil seal pan, said seal being entirely formed of resilient flexible and readily deformable material.

5. The apparatus of claim 4 wherein said seal is formed of a rubbery material.

6. The apparatus of claim 5 wherein said oil seal includes an insert sealing ring in said other of said end members concentric of said opening in the latter, said sealing ring being adapted to sealingly bear against an axle received in the latter opening.

7. The apparatus of claim 6 wherein said sealing ring is formed of a felt-like material.

8. An oil seal for journal boxes comprising an oil pack pan forming the base of said seal, a front side element and a rear side element extending upwardly from said pan, other spaced side elements connected to and extending laterally of the first mentioned side elements, said front side element having an inspection opening, a cover means comprising an element integrally connected to said front side element and normally in a position to close said opening in said front side element, said cover being readily displaceable through deformation of said seal to uncover said opening, the rear side element having a cylindrical flange, said flange comprising means adapted to sealingly engage an axle.

9. The combination of claim 8 including said seal being formed substantially entirely of a resilient readily deformable material.

References Cited in the file of this patent

UNITED STATES PATENTS

| | | |
|---|---|---|
| 606,686 | Scrogin et al. | July 5, 1898 |
| 2,191,468 | Hennessy | Feb. 27, 1940 |
| 2,534,045 | Massy | Dec. 12, 1950 |
| 2,670,998 | Barber | Mar. 2, 1954 |
| 2,683,065 | Gillespie | July 6, 1954 |
| 2,720,431 | Browne et al. | Oct. 11, 1955 |
| 2,758,853 | Beck | Aug. 14, 1956 |
| 2,858,148 | Klingler | Oct. 28, 1958 |